(12) United States Patent
Hotta et al.

(10) Patent No.: US 8,566,932 B1
(45) Date of Patent: Oct. 22, 2013

(54) ENFORCING GOOD NETWORK HYGIENE USING REPUTATION-BASED AUTOMATIC REMEDIATION

(75) Inventors: Nobuto Max Hotta, Torrance, CA (US); Shireen Rivera, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 767 days.

(21) Appl. No.: 12/533,958

(22) Filed: Jul. 31, 2009

(51) Int. Cl.
| G06F 11/00 | (2006.01) |
| G06F 12/14 | (2006.01) |
| G06F 17/30 | (2006.01) |
| G06F 7/04 | (2006.01) |
| G08B 23/00 | (2006.01) |

(52) U.S. Cl.
USPC ................................. 726/22; 726/2; 726/24

(58) Field of Classification Search
USPC .............................................. 726/2–3, 11, 22
See application file for complete search history.

(56) References Cited

U.S. PATENT DOCUMENTS

| 7,284,124 | B1 | 10/2007 | Ginsberg |
| 7,490,356 | B2 | 2/2009 | Lieblich et al. |
| 7,571,482 | B2 * | 8/2009 | Polyakov et al. ............. 726/24 |
| 7,617,519 | B2 | 11/2009 | Williams |
| 7,647,634 | B2 * | 1/2010 | Mayfield et al. ............. 726/22 |
| 7,707,632 | B2 * | 4/2010 | Nath et al. ............. 726/23 |
| 7,761,912 | B2 * | 7/2010 | Yee et al. ............. 726/11 |
| 7,788,700 | B1 | 8/2010 | Feezel et al. |
| 7,831,522 | B1 | 11/2010 | Satish et al. |
| 7,870,609 | B2 | 1/2011 | Hulten et al. |
| 7,917,481 | B1 * | 3/2011 | Kale et al. ............. 707/693 |
| 8,087,082 | B2 | 12/2011 | Bloch et al. |
| 8,225,406 | B1 | 7/2012 | Nachenberg |
| 8,250,657 | B1 | 8/2012 | Nachenberg et al. |
| 8,359,632 | B2 * | 1/2013 | Guo et al. ............. 726/3 |
| 2002/0046041 | A1 | 4/2002 | Lang |
| 2004/0019807 | A1 | 1/2004 | Freund |
| 2006/0253458 | A1 | 11/2006 | Dixon et al. |
| 2006/0253583 | A1 | 11/2006 | Dixon et al. |
| 2007/0033636 | A1 | 2/2007 | Buckley et al. |
| 2007/0064617 | A1 | 3/2007 | Reves |
| 2007/0067844 | A1 | 3/2007 | Williamson et al. |

(Continued)

OTHER PUBLICATIONS

"GreenBorder", Wikipedia, 1 page, [online] [Retrieved on Dec. 31, 2008] Retrieved from the Internet <URL:http://en.wikipedia.org/w/index.php?title=GreenBorder&printable=yes>.

(Continued)

*Primary Examiner* — Saleh Najjar
*Assistant Examiner* — Feliciano Mejia
(74) *Attorney, Agent, or Firm* — Fenwick & West LLP

(57) ABSTRACT

Reputation-based automatic remediation is applied for enforcing good network hygiene of a client. A scanning module scans the client to detect files on the client in response to an attempt by the client to connect to a secure network. A reputation score module retrieves onto the client a reputation score for each of the files detected. The reputation scores can be retrieved from a reputation database of a reputation server storing reputation data for files. A hygiene score module calculates on the client a hygiene score for the client based on the reputation scores for the files on the client. The hygiene score indicates a likelihood of the client to engage in risky behavior. The threshold determination module determines whether the hygiene score exceeds a threshold for bad client hygiene. The policy module applies a policy to the client that restricts network access in response to the hygiene score for the client exceeding the threshold.

20 Claims, 10 Drawing Sheets

(56) References Cited

U.S. PATENT DOCUMENTS

| | | | |
|---|---|---|---|
| 2007/0094260 A1 | 4/2007 | Murphy et al. | |
| 2007/0168311 A1 | 7/2007 | Genty et al. | |
| 2007/0261116 A1 | 11/2007 | Prafullchandra et al. | |
| 2008/0022384 A1 | 1/2008 | Yee et al. | |
| 2008/0052758 A1 | 2/2008 | Byrnes | |
| 2008/0092235 A1 | 4/2008 | Comlekoglu | |
| 2008/0115213 A1 | 5/2008 | Bhatt et al. | |
| 2008/0120699 A1 | 5/2008 | Spear | |
| 2008/0133531 A1 | 6/2008 | Baskerville et al. | |
| 2008/0141366 A1 | 6/2008 | Cross et al. | |
| 2008/0189788 A1 | 8/2008 | Bahl | |
| 2008/0255928 A1 | 10/2008 | Tomeny | |
| 2008/0288330 A1 | 11/2008 | Hildebrand et al. | |
| 2009/0044024 A1* | 2/2009 | Oberheide et al. | 713/188 |
| 2009/0165131 A1* | 6/2009 | Treadwell | 726/22 |
| 2009/0172815 A1 | 7/2009 | Gu et al. | |
| 2009/0240769 A1 | 9/2009 | Schran | |
| 2009/0282476 A1 | 11/2009 | Nachenberg et al. | |
| 2009/0287819 A1* | 11/2009 | Iverson | 709/225 |
| 2009/0328209 A1 | 12/2009 | Nachenberg | |
| 2009/0328224 A1 | 12/2009 | Hernacki et al. | |
| 2010/0031361 A1* | 2/2010 | Shukla | 726/24 |
| 2010/0125911 A1 | 5/2010 | Bhaskaran | |

OTHER PUBLICATIONS

Ioffe, J., "To Catch a Cyberthief: How Symantec Does It," Fortune Brainstorm Tech, Sep. 14, 2009, 3 pages. [Online] [Retrieved on Mar. 30, 2010] Retrieved from the Internet<URL:http://brainstormtech.blogs.fortune.cnn.com/2009/09/14/to-catch-a-cyberthief-how-symantec-does-it/ >.

Rubenking, N., "Nonsignature Antimalware", PCMag.com, Oct. 30, 2006, 6 pages, [online] [Retrieved on Dec. 31, 2008] Retrieved from the Internet <URL:http://www.pcmag.com/print_article2/0,1217,a%253D181852,00.asp>.

European Extended Search Report, European Application No. 09169538.7, Oct. 25, 2010, 5 pages.

Egan, G., "Not All Reputation Technologies are Created Equal," Symantec Corporation, Sep. 22, 2009, [Online] [Retrieved on Mar. 30, 2010] Retrieved from the Internet<URL:http://www.symantec.com/connect/blogs/not-all-reputation-technologies-are-created-equal>.

"TrustedSource™: the Next-Generation Reputation System White Paper," Secure Computing Corporation, Oct. 2006, 6 pages.

Walsh, L., "Careful, Trend Micro Might Give You a Bad Web Reputation," ChannelWeb Network, Mar. 26, 2007, [online] [Retrieved on Jun. 21, 2007] Retrieved from the Internet<URL:http://www.v3.crn.com/security/198500632>.

European Examination Report, European Application No. 09169538.7, Jan. 16, 2012, 4 pages.

* cited by examiner

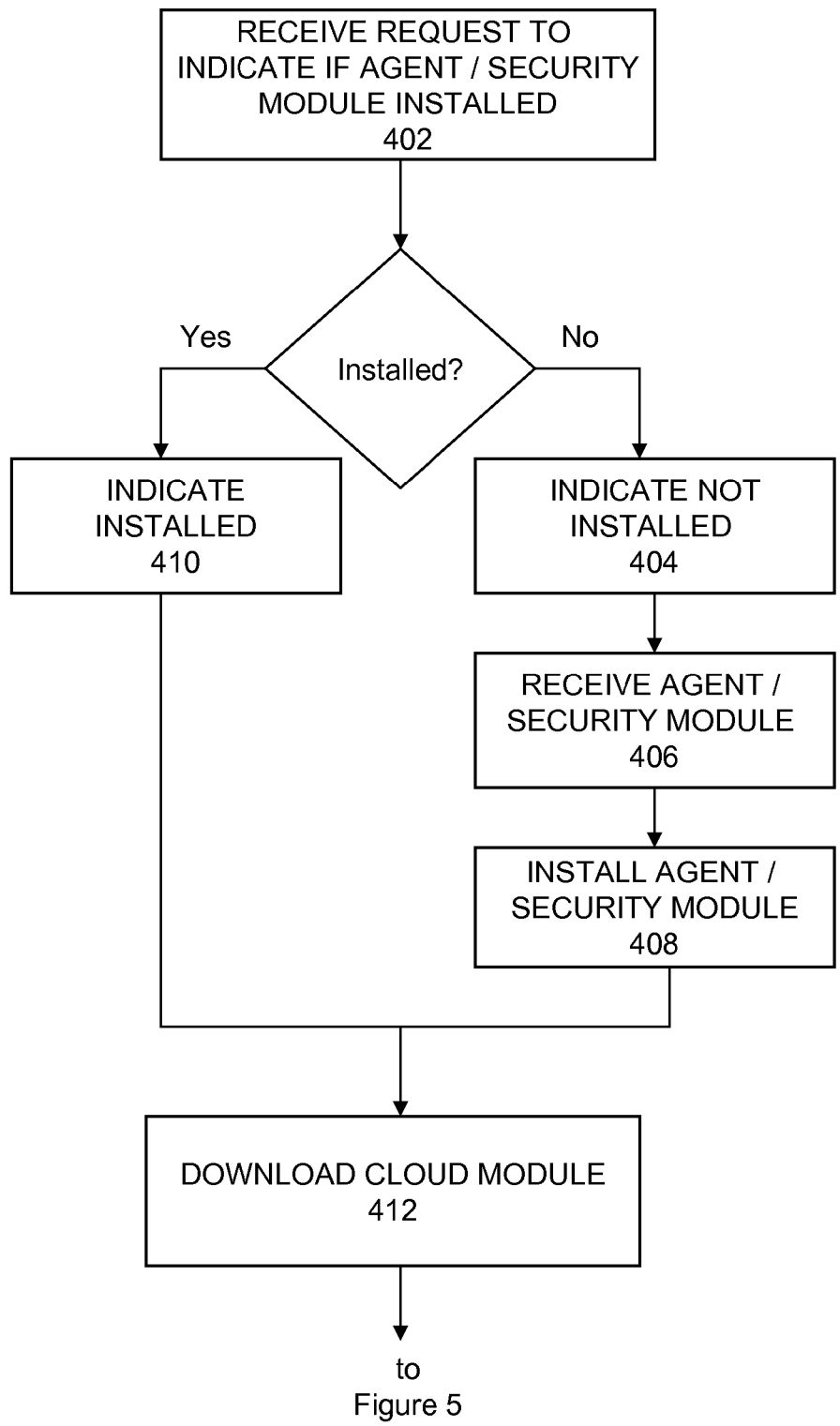
FIGURE 4 (Security Module 120)

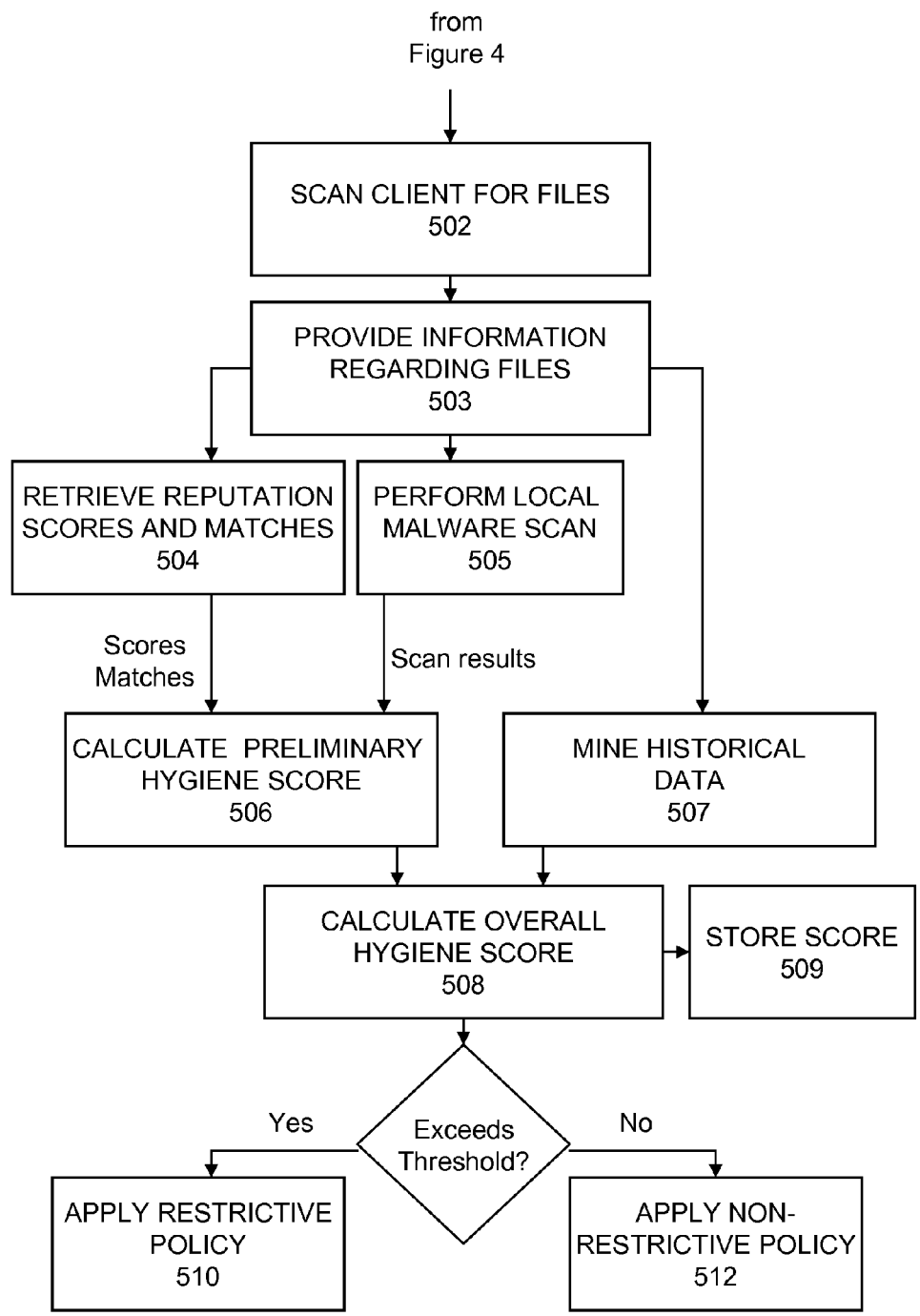
FIGURE 5 (Security Module 120)

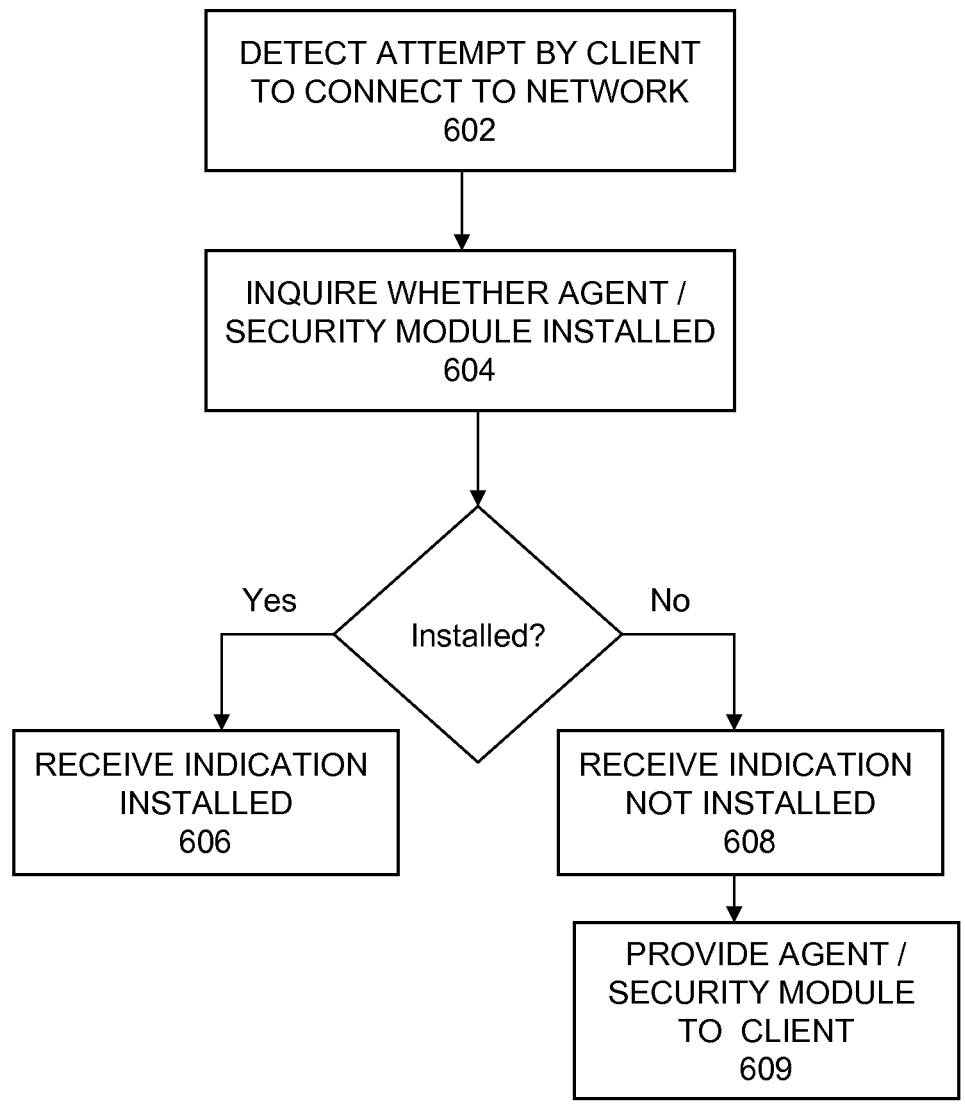
FIGURE 6 (Enforcer 114)

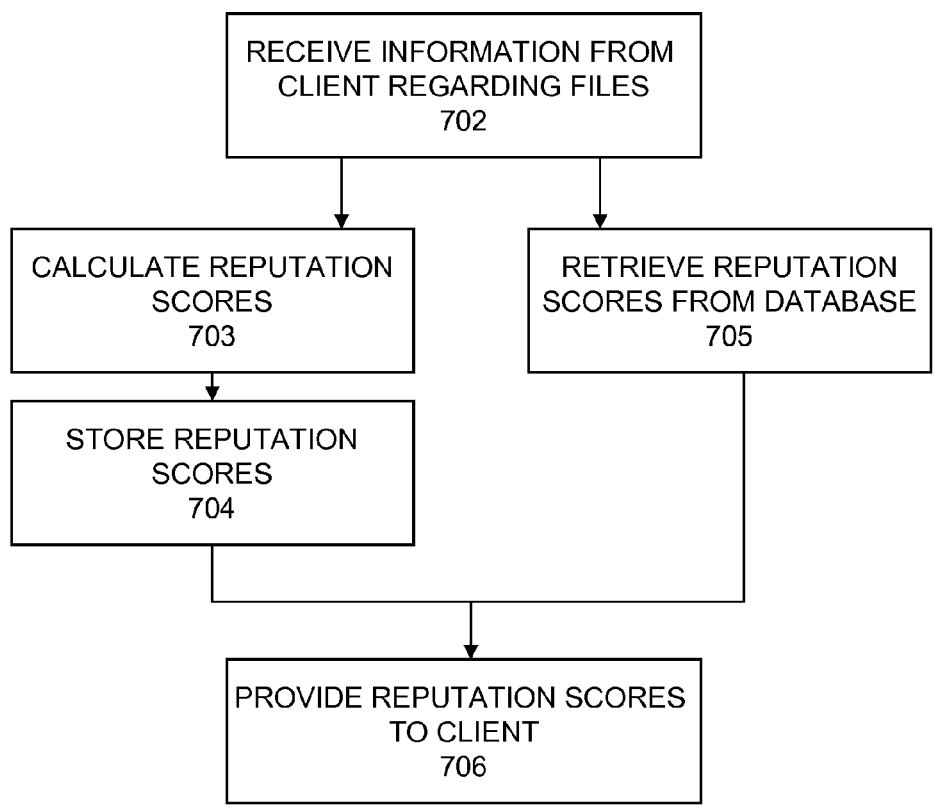
FIGURE 7 (Reputation Server 116)

ENFORCING GOOD NETWORK HYGIENE USING REPUTATION-BASED AUTOMATIC REMEDIATION

BACKGROUND OF THE INVENTION

1. Field of the Invention

This invention pertains in general to computer security, and more specifically to enforcing good network hygiene using reputation-based automatic remediation.

2. Description of the Related Art

Network Access Control (NAC) is a networking solution using a set of rules to define and implement a policy that describes how to secure access to a network by devices. NAC controls access of computers to a network by setting up policies for accessing the network. Typically, when a computer connects to a network, it is not permitted to access anything unless it complies with a set of rules (e.g., antivirus protection level, update installations, certain other system configurations, and so forth). While the computer is being checked for compliance with the rules, the computer can often only access resources that can remediate any issues before the computer is granted full network access. Once the computer has met the requirements, the computer is able to access network resources and the Internet, though access may still be limited for some clients that are not in full compliance as defined by the NAC policies. Where a client is granted only limited access, the NAC may impose limitations on what the client can do on the network, what the client can access, and so forth. One goal of NAC is to prevent access to the network by computers lacking security software, lacking the latest software patches, and having other limitations that make the computer a risk to the network. In this manner, the NAC can potentially prevent the spread of malware from a potentially infected computer via the network to other computers on the network.

NAC software currently relies on a hard set of rules to determine if an endpoint or client is in compliance with a network access policy before allowing access to the network. As described above, these rules include checks, such as whether antivirus software is enabled on the client, whether the malware definitions on the client are up-to-date, and other similar checks. If the client fails to meet one or more of the checks, the client may not be granted access to the network or may be given only limited access.

While these NAC rules are important, these rules do not address the complexities in determining more abstract states of clients. For example, even if the client has the appropriate security software installed and the available patches, the client might still generally have a tendency to take risky actions, download suspicious software, or become infected with malware in the future. The pre-set NAC rules used today are not capable of dynamically managing these more abstract and constantly changing states of computers when deciding whether or not to allow network access. Instead, the current NAC software is typically limited to determining whether or not a client complies with each of the pre-defined rules. The current NAC software does not look at degrees of compliance, review reputations of programs on a client, or consider overall behavior of a computer over time.

Therefore, there is a need in the art for a solution that enforces good network hygiene for clients using reputation-based automatic remediation.

DISCLOSURE OF INVENTION

The above and other needs are met by a method, computer-implemented system, and computer program product in which a security module performs reputation-based automatic remediation for enforcing good network hygiene of a client. The method includes scanning the client to detect a plurality of files on the client in response to an attempt by the client to connect to a secure network. The method also comprises retrieving onto the client a reputation score for each of the files detected and calculating on the client a hygiene score for the client based on the reputation scores for the files on the client. The hygiene score indicates a likelihood of the client to engage in risky behavior. The method also includes determining whether the hygiene score exceeds a threshold for bad client hygiene. The method further comprises applying a policy to the client that restricts network access in response to the hygiene score for the client exceeding the threshold In an embodiment of the system, a scanning module scans the client to detect files on the client in response to an attempt by the client to connect to a secure network. A reputation score module retrieves onto the client a reputation score for each of the files detected. A hygiene score module calculates on the client a hygiene score for the client based on the reputation scores for the files on the client. The hygiene score indicates a likelihood of the client to engage in risky behavior. The threshold determination module determines whether the hygiene score exceeds a threshold for bad client hygiene. The policy module applies a policy to the client that restricts network access in response to the hygiene score for the client exceeding the threshold.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 4 is a flowchart illustrating steps performed by the security module 120, according to one embodiment of the present invention.

FIG. 5 is a flowchart illustrating further steps performed by the security module 120, according to one embodiment of the present invention.

FIG. 6 is a flowchart illustrating steps performed by the enforcer 114 according to one embodiment of the present invention.

FIG. 7 is a flowchart illustrating steps performed by the reputation server 116 according to one embodiment of the present invention.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
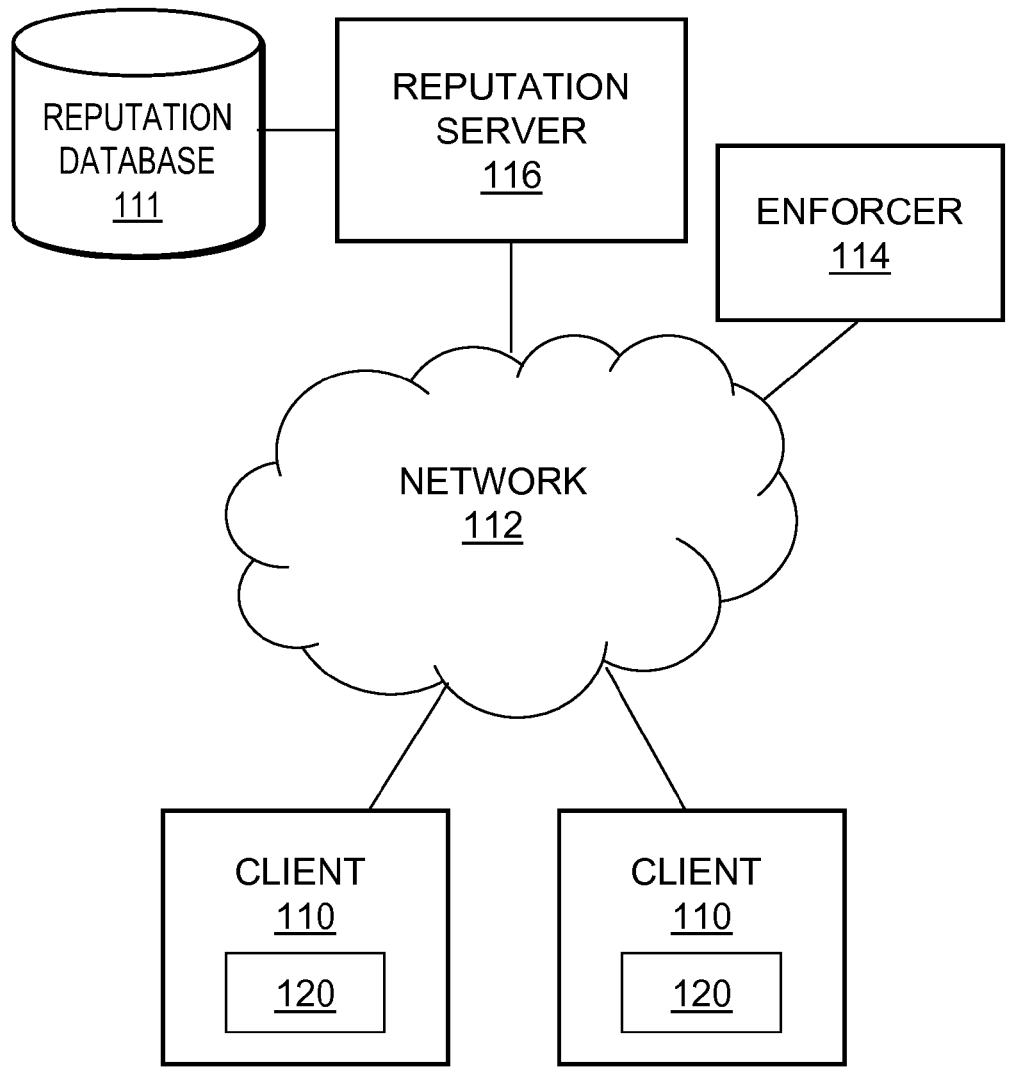
FIG. 1 is a high-level block diagram illustrating an example of a computing environment 100, according to one embodiment of the present invention.

FIG. 1 is a high-level block diagram illustrating a computing environment 100 according to an embodiment. FIG. 1 illustrates a reputation server 116, an enforcer 114, and clients 110 connected by a network 112. Only two clients 110 are shown in FIG. 1 in order to simplify and clarify the description. Embodiments of the computing environment 100 can have thousands or millions of clients 110, as well as multiple servers 116. In some embodiments, the clients 110 are only connected to the network 112 for a certain period of time or not at all.

The reputation server 116 serves information or content to client computers 110 via the network 112. In one embodiment, the reputation server 116 is located at a website provided by SYMANTEC™ CORPORATION on the network 112, although the server can also be provided by another entity. The reputation server 116 can include a reputation database 111 storing information and a web server for interacting with clients 110. The reputation database 111 can store reputation scores for a number of different files that might be present on any of the clients 110. The reputation server 116 can send information (e.g., reputation scores) stored in the database across the network 112 and to the clients 110. For example, in response to a request from a client 110 for reputation scores for certain files on that client 110, the reputation server 116 can send the corresponding reputation scores for each of those files to the requesting client 110. One or more of the functions of the reputation server 116 can also be executed on the clients 110 or in a cloud computing environment.

The enforcer 114 is a component that controls or otherwise manages access between the clients 110 and the network 112. In some embodiments, the enforcer is a Dynamic Host Configuration Protocol (DHCP) component. In some embodiments, the enforcer 114 is a component on a Local Area Network (LAN) or Wide Area Network (WAN). In other embodiments, the enforcer is an internet router or gateway enforcer. The enforcer 114 provides to the clients 110 an agent for download onto the clients 110. The agent forms a portion of the security module 120, and can perform steps for network access determination (described in more detail below). The enforcer 114 shown in FIG. 1 is just one embodiment of how the enforcer 114 can be positioned relative to other elements in the Figure. In other embodiments, the enforcer 114 sits between the clients 110 and the network 112, an example being when the enforcer is the primary local area network gateway server for the client 110. In some embodiments, the enforcer 114 provides security tokens, access keys, passwords, routing table adjustments, or other authorizations that control the network access of the client 110. In still other embodiments, the enforcer 114 is included as a part of the reputation server 116.

The clients 110 are computers or other electronic devices that can interact with the server 116, the enforcer 114, or other clients 110. The clients 110, for example, can be personal computers executing a web browser that allows the user to browse and search for information available at a website associated with the server 116. In other embodiments, the clients 110 are network-capable devices other than a computer, such as a personal digital assistant (PDA), a mobile telephone, a pager, a television "set-top box," etc. The clients 110 preferably execute an operating system (e.g., LINUX®, one of the versions of MICROSOFT WINDOWS®, and PALM OS®), which controls the operation of the computer system, and executes one or more application programs. The clients 110 can perform activities and make requests for or otherwise acquire information from the reputation server 116, the enforcer 114, or other computers. For example, the clients 110 can receive reputation scores from the reputation server 116 and can receive an agent for download from the enforcer 114.

The network 112 enables communications among the entities connected to it. In one embodiment, the network 112 is the Internet and uses standard communications technologies and/or protocols. In some embodiments, one or more of the components in FIG. 1 are located on a LAN or WAN subnetwork that may be connected to the Internet. Thus, the network 112 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 112 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 112 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above. In some embodiments, the network 112 is a secure network. As used herein, the term "secure network" refers to a network that is protected from unauthorized access.

The components of FIG. 1 could be arranged in various ways. For example, the client 110 could access a corporate network from a WAN or from a LAN. The enforcer 114 can be hosted in the corporate network and accessed by the client 110 either from the WAN or the LAN. Thus, downloading components onto the client 110 (e.g., the agent or cloud module, described below) can occur over the LAN or WAN depending on the location of the client 110. In some embodiments, the reputation server 116 and the enforcer 114 can be co-located by using a configuration in which a master copy of a reputation server 116 is hosted by a security software company (e.g., SYMANTEC) and all or part of that server is replicated and hosted locally by a corporation. In some embodiments, that corporation can co-locate the replicated server and the enforcer within the corporate network, e.g. by locating them on the same computer, on the same corporate cloud, or on the same protected corporate network (e.g. LAN, WAN, or corporate intranet). In some embodiments, the replicated server is not an exact copy of the master server, but it can either cache reputation information as it is requested (e.g., with stale-cache/expiration time tracking so that cached items remain sufficiently fresh or accurate), or it can synchronize with the master reputation server on a scheduled basis. In some embodiments, a replicated server is emulated by a proxy connection to the master server.

In the embodiment illustrated in FIG. 1, the clients 110 execute a security module 120 for applying reputation-based automatic remediation for enforcing network hygiene of a client. The security module 120 can be a discrete application program, or the module 120 can be integrated into another application program or the client's 110 operating system. In some embodiments, a portion of the security module 120 is executed on the reputation server 116, on the enforcer 114, or in a cloud computing environment.

As explained above, the NAC controls access of computers to networks by setting up policies for accessing the network. The security module 120 is designed to dynamically manage abstract states of clients 110 when deciding whether or not to allow network access. The security module 120 can apply vast amounts of cloud-based reputation data in a network access solution to enforce and maintain a clean environment with a high level of confidence. Further, the cleanliness determination and the evaluation of the appropriate network access to allow can be performed on the client 110, rather than requiring that the steps be performed on a server 116.

In brief summary, the functions of the security module 120 are described here. In some embodiments, when a client 110 attempts to connect to a secure network 112, the enforcer 114 requires the module 120 to download an agent (which forms a part of the security module 120) from the enforcer 114. In some embodiments, the agent downloads a cloud module that also forms a part of the security module 120, which scans the client 110 to detect files on the client 110 and retrieves from the reputation server 116 (e.g., the reputation database 111) a reputation score for each of the files detected. The cloud module calculates on the client 110 a hygiene score for the client 110 based on the reputation scores for the files on the client 110. The agent of the security module 120 further determines whether the hygiene score exceeds a threshold for bad client hygiene and applies a policy to the client 110 that restricts network access in response to the hygiene score for the client 110 exceeding the threshold. Since the hygiene score represents the overall state of the client, the security module 120 thus applies this client state analysis in deciding whether or not to allow network access.

The security module 120 can calculate a hygiene score for the client 110 based on the reputation scores for the files on the client 110. As used herein, the term "hygiene score" represents an assessment of the trustworthiness of the client 110 or a likelihood of the client 110 to engage in risky behavior (e.g., downloading or installing untrustworthy files, visiting suspicious websites, opening risky email attachments, applying poor password protection practices, etc.). "Trustworthiness" in this context refers to a measure of the client's likelihood of being infected or propensity for getting infected by malware and other computer related threats. A client 110 that is infected more often or engages in risky behavior more often is less trustworthy and receives a lower hygiene score. For example, a client 110 running one or more programs known to be suspicious or to be associated with malware infections will be assigned a lower hygiene score than a client 110 that does not run such programs. The client 110 can calculate its hygiene score using any or all of a collection of different types of data describing the state of the client 110, such as the files present, downloaded, installed, or executed on the client 110, websites visited by the client 110, and malware detected on the client 110, and so forth. In some embodiments, in calculating the hygiene score, the client 110 uses information from the reputation server 116 regarding the collective states of clients 110 on the network 112, regarding the clients' hygiene scores, and so forth. In some embodiments, clients 110 each report their hygiene scores regularly or on request to the reputation server 116 for use in calculating reputation scores, as explained below. As used herein, "malicious code" or "malware" is any code that enters a computer without an authorized user's knowledge and/or without an authorized user's consent with the intention of conducting malicious activities on the computer or on other computers.

As explained above, the security module 120 can retrieve reputation scores for files (e.g., particular programs, websites, and other computer-related entities encountered by the clients 110) on the client 110. The reputation scores are typically computed by the reputation server 116 (though can be computed by the client 110 for some files). As used herein, a "reputation score" is an assessment of the likelihood that an entity is malicious (e.g., is a computer-related threat). For example, if a particular file is predominantly encountered by clients 110 known to engage in risky behavior (e.g., clients with low hygiene scores), there is an elevated risk that the file is malicious because most users that use the file are poor at avoiding computer threats. Therefore, the file is likely to receive a low reputation score. Similarly, a website that is more frequently visited by clients 110 having high hygiene scores than clients 110 with low hygiene scores is likely to receive a high reputation score because the website is predominantly frequented by users that are good at avoiding computer threats. Thus, the reputation server 116 can consider the actions of numerous clients and their hygiene scores to determine what reputation score to assign to a file. The reputation server 116 provides the reputation scores to the clients 110, and the security module 120 of the client 110 can use this information to calculate the hygiene score for the client 110 and potentially limit the client's network access if the client 110 has poor hygiene.

Using hygiene and reputation scores in this manner associates a client's or its user's ability to avoid threats with decisions to engage in certain activities involving computer-related entities encountered. This approach leverages the collective intelligence associated with numerous clients/users to assign reputation scores to files, websites, and other entities that accurately measure the risks associated with the entities. The reputation scores are computed without requiring a user to explicitly evaluate or judge the entity. Thus, the approach is well-suited to a computing environment where there are significant amounts of malware or other threats that might not be identified using conventional signature scanning and/or heuristic techniques.

Figure 2:
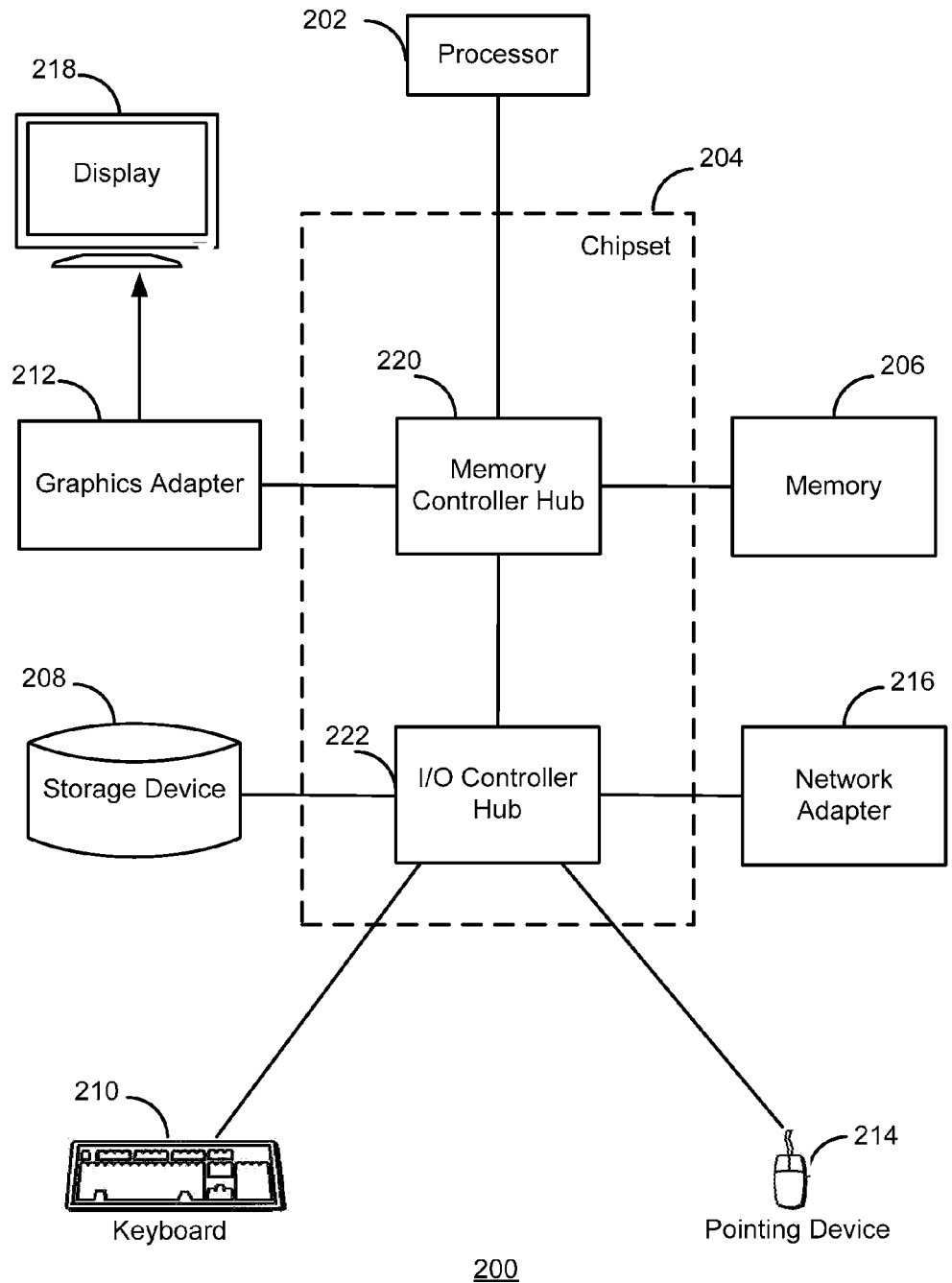
FIG. 2 is a high-level block diagram illustrating a computer system 200 for use with the present invention.

FIG. 2 is a high-level block diagram illustrating an example of a computer 200 for use as a server 16 and/or client 110. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display device 218. The network adapter 216 couples the computer system 200 to the network 112. Some embodiments of the computer 200 have different and/or other components than those shown in FIG. 2.

The computer 200 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

The types of computers 200 used by the entities of FIG. 1 can vary depending upon the embodiment and the processing power used by the entity. For example, a client 110 that is a mobile telephone typically has limited processing power, a small display 218, and might lack a pointing device 214. The server 116, in contrast, may comprise multiple blade servers working together to provide the functionality described herein.

Figure 3A:
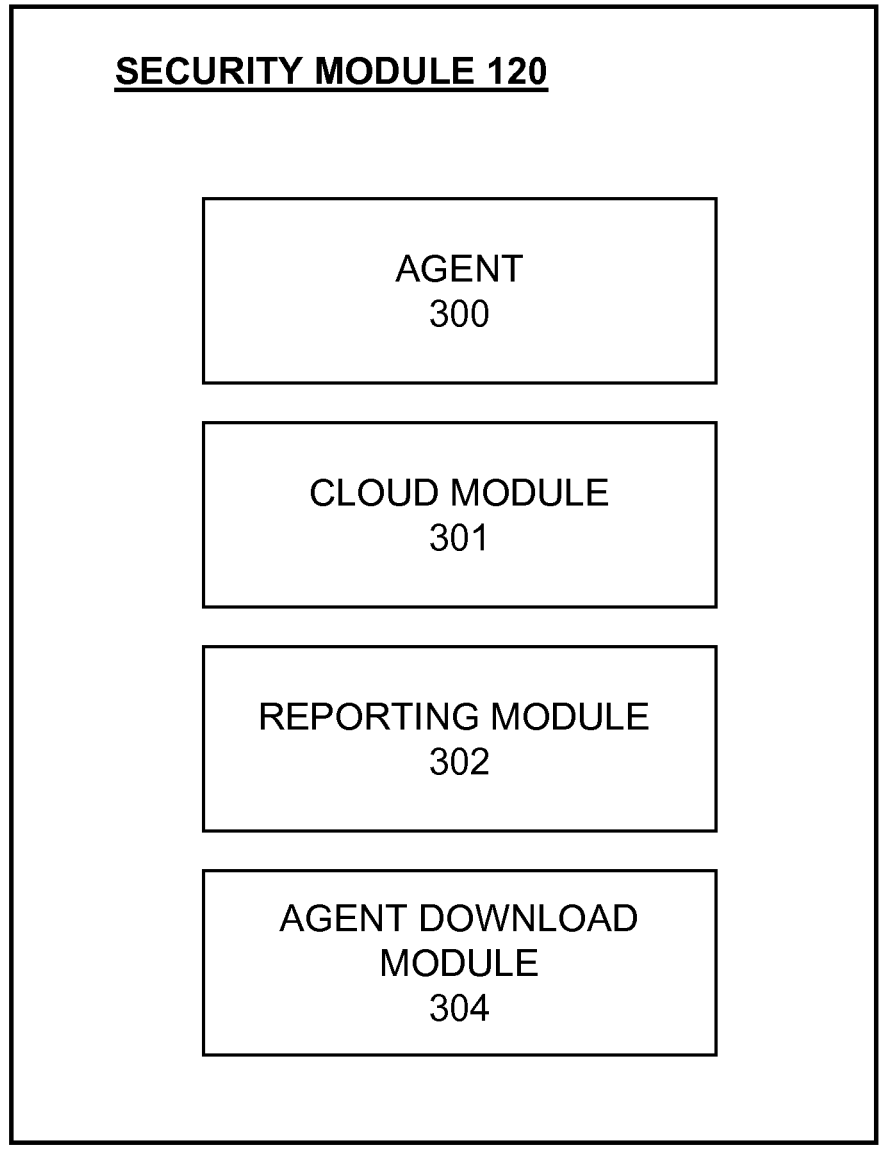
FIG. 3a is a high-level block diagram illustrating the functional modules within the security module 120, according to one embodiment of the present invention.

FIG. 3a is a high-level block diagram illustrating the functional modules within the security module 120, according to one embodiment of the present invention. The security module 120, in the embodiment illustrated in FIG. 3a, includes an agent 300, a cloud module 301, a reporting module 302, and an agent download module 304. Some embodiments of the security module 120 have different and/or additional modules than those shown in FIG. 3a and the other figures. Likewise, the functionalities can be distributed among the modules in a manner different than described herein. Certain modules and functions can be incorporated into other modules of the security module 120 and/or other entities on the network 112, including the server 116 (the same is true for FIGS. 3b-3e).

Figure 3B:
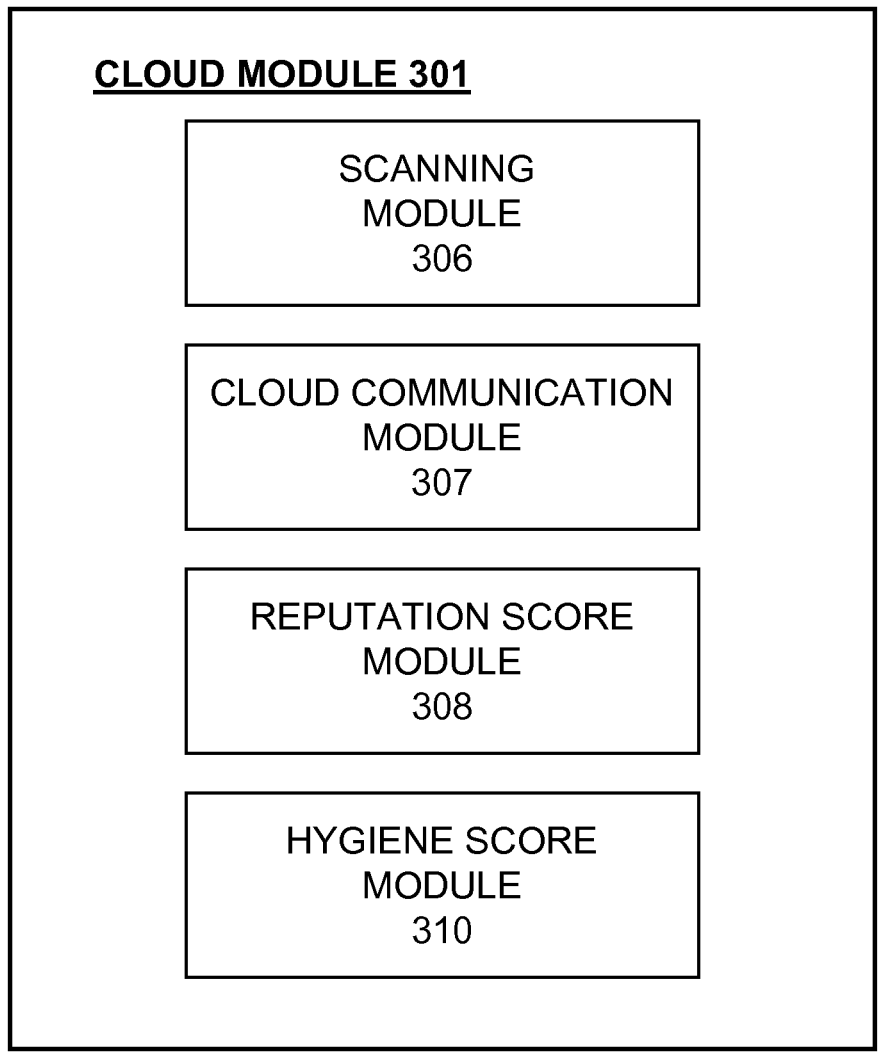
FIG. 3b is a high-level block diagram illustrating the functional modules within the cloud module 301 of the security module 120, according to one embodiment of the present invention.
Figure 3C:
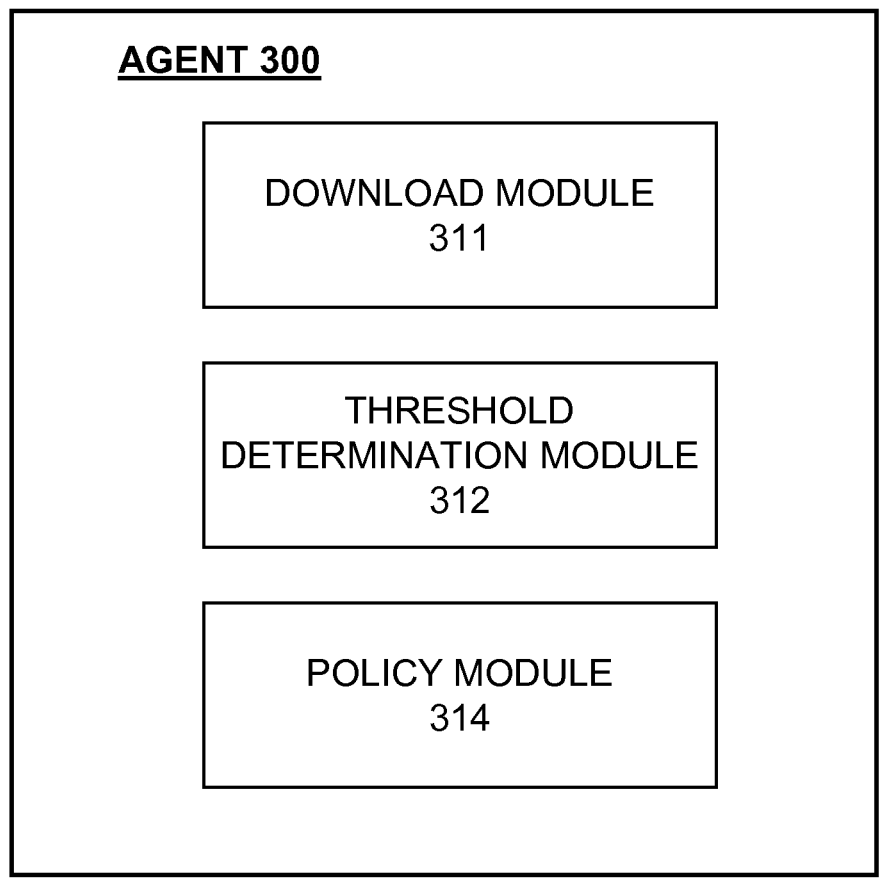
FIG. 3c is a high-level block diagram illustrating the functional modules within the agent 300 of the security module 120, according to one embodiment of the present invention.

The agent 300 is the portion of the security module 120 that performs some of the steps described above including the determination of whether the hygiene score exceeds the threshold and the application of a policy that controls network, application, and/or device access. The agent 300 is illustrated in FIG. 3c and is described in detail below with regard to FIG. 3c. In some embodiments, the agent 300 portion of the security module 120 is not present on the client 110 until it is downloaded by the agent download module 304 of the security module 120 (described below).

The cloud module 301 is the portion of the security module 120 that performs many of the steps described above including the scanning of the client 110, the retrieval of reputation scores, and the calculation of the hygiene score. The cloud module 301 is illustrated in FIG. 3b and is described in detail below with regard to FIG. 3b. In some embodiments, the cloud module 301 portion of the security module 120 is not present on the client 110 until it is downloaded by the agent 300 of the security module 120 (or another security module component), as described regarding FIGS. 3b and 3c. In these embodiments, upon download of the agent 300 onto the client 110, the agent 300 applies a host integrity (HI) script to the client 110 that then downloads the cloud module 301 onto the client 110. In other embodiments, however, the cloud module 301 is already present with the download of the agent 300.

The reporting module 302 of the security module 120 receives a request from the enforcer 114 to indicate whether an agent 300 portion of the security module 120 is installed on the client 110 in response to an attempt by the client 110 to connect to the network 112. The reporting module 302 then indicates to the enforcer 114 whether or not the agent 300 has been installed. Where the agent 300 has already been installed, the reporting module 302 reports this to the enforcer 114. The various modules of the agent 300 and cloud module 301 can then begin the network access analysis to determine what network access to grant to the client 110. Where the agent 300 has not yet been installed, the reporting module 302 indicates this to the enforcer 114.

The agent download module 304 receives the agent 300 from the enforcer 114 for installation on the client 110 (where the agent 300 is not already installed). In some embodiments, the module 304 downloads the agent 300 onto the client 110 from the enforcer 114. In some embodiments, the module 304 further installs the agent 300 on the client 110. In some embodiments, the security module 120 does not download an agent 300 from the enforcer 114, but instead all portions of the security module 120 are already present on the client 110 and can perform the network access determination described below regarding FIGS. 3b and 3c whenever the client 110 attempts network access. Further, some embodiments of the security module 120 do not include modules 302 and 304. In this case, the enforcer 114 can query the client 110 regarding presence of the agent 300, and the client 110 can download the security module 120/agent 300, which downloads the cloud module 301, and these components perform the network access determination described regarding FIGS. 3b and 3c.

In some embodiments, the security module 120 may not be initially present on the client 110, but must be downloaded automatically upon network access. As one example, the enforcer 114 can try to contact the client 110 using a proprietary port or other proprietary or standard communication protocol as implemented by the security module 120. If there is no response, then there is no security module 120, and the enforcer 114 will initiate a download of the security module 120 to the client 110, which can download an agent 300. As another example in which the security module 120 may not initially be present, the enforcer 114 can download a component (e.g., an agent download module 304) or other piece of code that first checks to see if the security module 120 is installed. If not, this component initiates a download from either a corporate server or from the Internet (such as from a SYMANTEC™ LIVEUPDATE SERVER or from another hosting service outside of the corporation). As still another example, the enforcer 114 may always download the agent 300 because the agent 300 is configured to be a network-access only agent that runs upon network access. In some cases, the agent 300 is then removed upon successful entry to the secured network.

FIG. 3b is a high-level block diagram illustrating the functional modules within the cloud module 301 that was illustrated in FIG. 3a, according to one embodiment of the present invention. The cloud module 301 of the security module 120 includes a scanning module 306, cloud communication module 307, a reputation score module 308 and a hygiene score module 310. The cloud module 301 is the portion of the security module 120 described above that can be downloaded (e.g., by the agent 300) for conducting a cloud scan. FIG. 3c, which is described in conjunction with FIG. 3b, is a high-level block diagram illustrating the functional modules within the agent 300 that was illustrated in FIG. 3a, according to one embodiment of the present invention. The agent 300 of the security module 120 includes a download module 311, a threshold determination module 312 and a policy module 314. The agent 300 is the portion of the security module 120 described above that can be received by the client 110 for conducting a network access determination.

The download module 311 of the agent 300 (FIG. 3c) downloads the cloud module 301, in some embodiments. The cloud module 301 can be downloaded from the enforcer 114 by the agent 300 (or by another security module component) once the agent 300 has been downloaded by the enforcer 114.

The scanning module 306 of the cloud module 301 (FIG. 3b) scans the client 110 to detect the files on the client 110 in response to an attempt by the client 110 to connect to a secure network. The files can include any files, programs, websites, or other entities on a client 110 that can have reputation scores. The scanning module 306 can perform the scan of the client 110 in a number of ways. In one embodiment, the module 306 identifies files that are resident on the client's storage device 208 and processes that are resident in the client's memory 206. These files can be identified when a network access attempt is made, or they can be identified in advance and information about the files stored. The stored information can also be updated over time as files are deleted and new files are added.

The cloud communication module 307 sends information regarding the detected files to the reputation server 116 to retrieve reputation scores for each of the files detected (described below). Application hashes and other application information, such as company name and digital certificate issuer (if signed), are sent by the module 307 to the reputation server 116.

As described above, in some embodiments, one or more of the functions of the reputation server 116 runs in a cloud-based computing environment, and it is this cloud environment with which the cloud communication module 307 communicates. Cloud computing is a style of computing in which dynamically scalable and often virtualized resources are provided as a service over the Internet. Cloud computing customers generally do not own the physical infrastructure serving as host to a particular software platform, but instead rent usage of resources from a third-party provider, where they consume these resources as a service and pay for resources used. In this case, the reputation server 116 is a cloud-based reputation system that can track useful attributes of clients 110, including their hygiene or the general cleanliness of the client 110. In these embodiments, the cloud module 301 conducts a cloud scan, in which the data regarding the files detected on the client 110 are provided to the reputation server 116 or cloud-based reputation system. The reputation scores are returned by the cloud, which are then used to compute hygiene scores. Thus, vast amounts of applicable cloud data can be leveraged by the cloud module 301 for detection and mitigation of clients 110 that are determined to have bad hygiene.

The reputation score module 308 of the cloud module 301 (FIG. 3b) retrieves onto the client a reputation score for each of the files detected. The reputation scores are retrieved from the reputation server 116 (e.g., from reputation database 111) that stores reputation data for files. The reputation server 116 can provide to the reputation score module 308 various different types of information. For example, the reputation server 116 can indicate whether the file matches a threat signature (e.g., a unique signature for malware). As explained above, the reputation server 116 can also provide to the reputation score module 308 the reputation score for each file detected (e.g., by the scanning module 306). The scores can range, for example, from definitely bad (e.g., within 0.001% assurance) to definitely good (e.g., within 0.001% assurance). The server's actions in providing reputation scores are described in more detail below regarding FIG. 3e. In some embodiments, the reputation score module 308 maintains a cache of reputation scores for certain programs, and consults the cache before (or instead of) contacting the reputation server 116 to determine whether the score is contained therein.

In some embodiments, the scanning module 306 discussed above performs a second scanning step upon receipt of information by the reputation score module 308. As explained above, the reputation server 116 can also send information regarding whether the files detected match any threat signatures. The scanning module 306 can then perform a local malware scan of the client 110 after downloading from the server 116 a set of malware definitions to detect any additional malware threats. In some embodiments, this second scan is performed by antivirus or other security software currently installed on the client 110.

The hygiene score module 310 of the cloud module 301 (FIG. 3b) calculates on the client 110 a hygiene score for the client 110 based on the reputation scores for the files on the client 110. The hygiene score module 310 can take the reputation scores and matches to threat signatures retrieved from the reputation server 116 by the reputation score module 308 and can take any threat signatures matches found by the scanning module 306 in the local malware scan, and can use all of this information to determine the preliminary hygiene score for that particular scan of the client 110.

The hygiene score module 310 can also mine any historical information stored on the client 110 regarding hygiene. In one embodiment, the module 310 mines stored hygiene scores for the client 110 from any previous scans conducted. In another embodiment, the module 310 mines information stored in any third party security software logs. More specifically, the module 310 can determine that the client 110 has security software pre-installed and can collect security data (e.g., number of malware infections, types of infections, severity of infections, etc. previously experienced by the client 110) from a log for the third party software (e.g., a vendor not also providing the security module 120). Using this data provided in the log, the module 310 can analyze previous threats on the client 110, and the results of the analysis can be included in the calculation of the hygiene score for the client 110. Clients 110 having had many infections in the past are given lower hygiene scores than clients 110 having had fewer infections.

The hygiene score module 310 uses the preliminary hygiene score determined based on the scan of the client 110 combined with the mined previous historical hygiene scores and any information retrieved from third party security logs in order to determine the overall hygiene score for the client 110. This is just one example of an embodiment for determining the overall hygiene score. In other embodiments, only some of this information is used to calculate the overall score, and additional information not described above can be used to calculate the score.

The hygiene score can take a variety of forms. In one embodiment, the hygiene score is a numeric value normalized within a given range, such as zero and one, to allow direct comparisons between hygiene scores of multiple clients. For example, a score of zero can represent the poorest hygiene while a score of one can represent the best hygiene. In other embodiments, the hygiene score is quantized into one of a limited set of values, e.g., the only possible hygiene scores are zero and one. As another example, a point system could be used in which a client is given a certain number of points for positive security practices, or points are deducted for negative security practices (e.g., points gained for each security patch installed, or points lost for every malware detection). Similarly, the points could be deducted for each file on the client 110 that has a low reputation score, and even according to how low is the reputation score. Using a point scale of 1 to 50, for example, a low-scoring client might have only a score of 10 while a high-scoring client might have a score of 45. As another example, a rating system or grading system could be used that grades each client in various categories (e.g., installation of security patches, past malware detections, user account controls, reputation scores of files on the client 110, etc.). Other similar point or rating systems could also be applied.

The hygiene score module 310 can also store the hygiene score calculated for the client 110 which can be used for determining the hygiene of the client 110 during subsequent attempts to connect to a network. The module 310 can further track hygiene of the client 110 over a period of time, and can update the hygiene score of the client 110 to represent the tracked hygiene. Thus, in some embodiments, the module 310 keeps stored an updated hygiene for the client 110, and the module's calculation of the hygiene score simply includes applying this previously-calculated score.

Other mechanisms can also be used in conjunction with hygiene scores for tracking the hygiene of a client 110. In one embodiment, the hygiene score module 310 determines, based on the local malware scan of the client 110, that the client 110 is infected with malware. In this case, the module 310 can apply a flag (e.g., a "still infected" flag) to the client 110 to indicate that the client 110 is currently infected. The flag is used in tracking hygiene of the client 110 over time, and indicating that the client 110 is still infected with malware that the client 110 has been unable to remove, and so is known to be a risk. The flag can be included, along with the reputation scores, in calculating the overall hygiene score of the client 110. Thus, a client 110 flagged as being infected will have a lower hygiene score than a client 110 without such a flag.

In general, hygiene scores for the client 110 can also incorporate data regarding the overall state of the client 110. For example, the module 310 can monitor the state of the client 110 over a period of time, including files that are introduced to, or executed on, the client 110, downloading of files from websites and/or other locations on the network 112, loading files onto the client 110 via removable media, installing of files onto the client, and executing of files on the client, web browsing and/or other activities conducted via the network 112, malware detections, and so forth. In one embodiment, the hygiene score module 310 uses these metrics based on the frequency of occurrence of certain events, such as malware detections. For example, the metrics can include the number of malware detections observed during a time period such as a week, month, or three-month interval. Likewise, the metrics can include the number of malware detections measured relative to a number of files downloaded and/or installed on the client 110. Similarly, the activities on which the metrics are based can include the frequency that the client 110 browses known malicious or unsavory websites (such as sex/gambling sites, sites with many pop-up windows, or sites known to host phishing attacks).

Further, hygiene scores can be calculated even when the client 110 is not attempting access to a secure network 112. For example, the scanning module 306 can run not only upon network access, but can also remain on the client 110 and perform periodic scans on a scheduled basis even after secure network access has been achieved. The hygiene module 310 can calculate the client hygiene after each scan and can store this data. The calculations made after these periodic scans can determine whether the client 110 can remain on the network or whether its hygiene score is now lower than the threshold, such that it is removed to a quarantine network and/or receives a restrictive application and device control policy (as explained below).

Once the overall hygiene score has been calculated by the hygiene score module 310, this module 310 returns the final score to the agent 300 for comparison to a threshold hygiene and for policy application, described below.

The threshold determination module 312 of the agent 300 (FIG. 3c) determines whether the hygiene score exceeds a threshold for bad client hygiene. In one embodiment, all clients 110 having hygiene scores below a set hygiene score number could be considered to exceed the threshold for bad hygiene. In another embodiment, the module 312 determines whether a count of a number of malware threats on the client 110 per time period exceeds a pre-set threshold. For example, the module 312 can consider the count of the number of files on the client 110 with low reputation scores, the number of malware infections of the client 110, the number of suspicious websites visited, etc. In some embodiments, the threshold is based on a calendar system. The module 312 can consider whether the threat count exceeds a certain time-based threshold (e.g., a per-day, per-week, or per-month threshold). For example, if the threshold is set at five threats per day, a client 110 having been determined to have more than five threats would exceed the threshold for bad hygiene. These clients 110 would have lower hygiene scores than other clients having only one or two threats per day, and would be more likely to get into a bad state (e.g., to become infected by malware).

In a further embodiment, the module 312 tracks patterns of behavior over a period of time. In this case, the first time a client 110 has more than the threshold number of threats or has lower than the threshold hygiene number, the client 110 may not be considered to have exceeded the threshold for bad hygiene. However, if this is a pattern of behavior in which the client 110 has this situation more than one day, or over a certain time period (e.g., over a week), the module 312 can then determine that the client 110 has exceeded the threshold for bad hygiene. The threshold can vary over time as the definition of bad client hygiene develops or changes.

The threshold applied to the client 110 can be set in a number of ways. In one embodiment, the threshold determination module 312 determines the appropriate threshold for the client 110. The threshold can be the same for all clients 110 or can differ for different clients 110. In another embodiment, the agent 300 includes data regarding the appropriate threshold for bad client hygiene for the client 110 upon download of the agent 300. This threshold can be set by the reputation server 116 when providing information to the cloud communication module 307 upon receipt of reputation queries. In another embodiment, this threshold can be set by the enforcer 114 when providing the agent 300 to the client 110.

The policy module 314 of the agent 300 (FIG. 3c) applies a policy to the client 110 that restricts network access in response to the hygiene score for the client 110 exceeding the threshold (as determined by the threshold determination module 312). This policy can be applied only temporarily, until the client 110 has remedied one or more of its security risks, or has corrected its hygiene score such that it no longer exceeds the bad hygiene threshold. In one embodiment, the module 314 determines the correct policy to apply based on the results from the threshold determination module 312. In another embodiment, the agent 300 includes data regarding the policy to be applied to the client 110 upon download of the agent 300. This policy information can be set by the enforcer 114 when providing the agent 300 to the client 110.

The policy applied by the module 314 can restrict access in a number of ways. As one example, the module 314 can allow the client 110 to access only a quarantine network or another type of limited network. A quarantine network is a restricted network that provides users with routed access only to certain hosts and applications. In one embodiment, quarantine is implemented such that the client 110 is routed only to patch and update servers, not to the rest of the network. In another embodiment, quarantine or limited network has a firewall and/or a device manager policy that is more restrictive than for the network for which the client attempted access. The client 110 might be limited in the types of actions that can be taken while using the quarantine/limited network, including limits on what files can be accessed or copied, limits preventing a user of the client from copying files onto a USB device, and so forth. As another example, the module 314 can restrict access using a captive portal that intercepts HTTP access to web pages, redirecting users to a web application that provides instructions and tools for updating the client 110. General network usage beyond the captive portal can be prevented until the client 110 is found to no longer exceed the threshold for bad hygiene.

Once the client 110 is determined to be clean after a remediation process, the client 110 can then be permitted access to the network. In this case, a policy is applied that allows full access. The data can subsequently be used for validating that it has regained good hygiene when the client 110 makes future network connection attempts.

As explained above, the modules illustrated in FIGS. 3a, 3b, and 3c represent just one example of an embodiment of the system. In other embodiments, the downloaded agent 300 performs all of the steps, including those of the cloud module 301. In still other embodiments, the security module 120 executed on the client 110 already contains all of its components, including the agent 300 and cloud module 301, and so no components are downloaded. In further embodiments, the security module 120 itself is downloaded for performing the network access control. Numerous other designs are also possible.

Figure 3D:
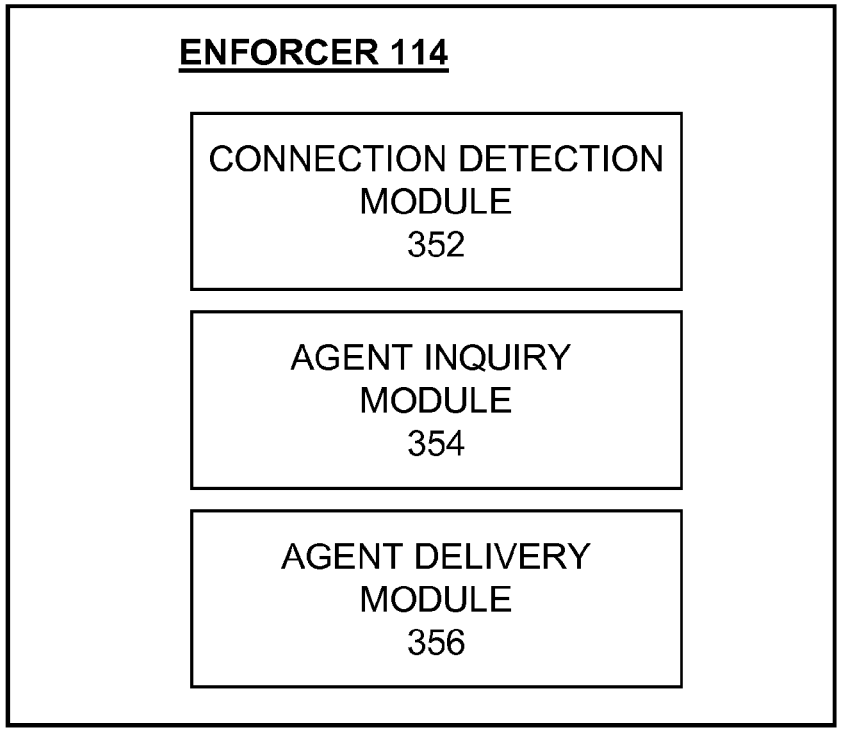
FIG. 3d is a high-level block diagram illustrating the functional modules within the enforcer 114, according to one embodiment of the present invention.

FIG. 3d is a high-level block diagram illustrating the functional modules within the enforcer 114, according to one embodiment of the present invention. The enforcer 114, in the embodiment illustrated in FIG. 3d, includes a connection detection module 352, an agent inquiry module 354, and an agent delivery module 356.

The connection detection module 352 detects an attempt by the client 110 to connect to a secure network 112. Upon this detection, the enforcer 114 can perform a number of additional actions that will permit the client 110 to be able to determine whether the client 110 should be allowed access to the network 112.

The agent inquiry module 354 sends an inquiry to the client 110 regarding whether or not an agent 300 is already present on the client 110. The module 354 can also receive the response from the client 110 regarding whether or not the agent 300 is present on the client 110. In some cases, a lack of response indicates that there is no agent 300 (or no security module 120). If an agent 300 is already present on the client 110, the module 354 can notify the agent 300 that the client 110 is accessing the network 112. If an agent 300 is not on the client 110, the module 354 can notify the agent delivery module 356. As explained above, the enforcer can download a component (e.g., an agent download module 304) that performs the actions of the agent inquiry module 354 to see if the security module 120 is installed. In embodiments in which the agent 300 is a network access agent that is always installed, the module 354 may not be included in the system.

The agent delivery module 356 delivers the agent 300 to the client 110 in response to the agent inquiry module 354 receiving an indication from the client 110 that there is no agent 300 present on the client 110. In some embodiments, the client 110 downloads the agent 300 from the module 356 or from some other location associated with the enforcer 114. As explained above, in some embodiments, the enforcer 114 includes with the agent 300 information regarding the threshold hygiene score to be applied (by the threshold determination module 312) and the policies to be applied (by the policy module 314). As also explained above, in some embodiments, the security module 120 is not initially present on the client 110, and so module 356 can provide the security module 120.

Figure 3E:
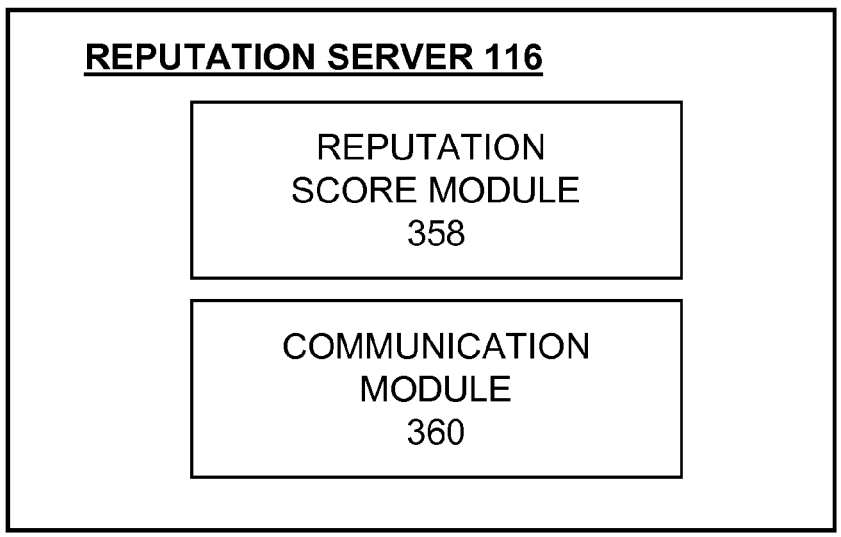
FIG. 3e is a high-level block diagram illustrating the functional modules within the reputation server 116, according to one embodiment of the present invention.

FIG. 3e is a high-level block diagram illustrating the functional modules within the reputation server 116, according to one embodiment of the present invention. The reputation server 116, in the embodiment illustrated in FIG. 3e, includes a reputation score module 358 and a communication module 360.

The reputation score module 358 determines the reputation scores for the files detected. As explained above, the client 110 determines what files are on the client 110 (e.g., performed by the scanning module 306), which information can then be provided to the server 116 (e.g., by the reputation score module 358). The module 358 can then determine reputation scores for these detected files.

The reputation scores can be determined in a number of ways. Where a score has been calculated in advance for a file, the module 358 can retrieve this score from the reputation score database 111. For example, for a particular program on the client 110, the reputation database 111 may already have stored a corresponding reputation score based on that program being executed on a number other clients 110. If that program is considered suspicious based on information acquired for that program relating to other clients, the program is given a lower reputation score than that of other programs that are less suspicious. The program might be given a low reputation score if the program is typically associated with infected clients, if the program is associated with clients having low hygiene scores, if the program is known to perform malicious or suspicious actions on clients 110, and so forth. Where a score has not yet been calculated for a file, the module 358 can calculate a score for that new file. Thus, where there is no information stored regarding a particular file detected on a client 110, the server 116 can compute a reputation score for this new file. This score can then be stored in database 111 for usage in the future with other clients 110 having that new file.

The reputation scores can be calculated in various manners. In one embodiment, the reputation score is computed as the fraction of trustworthy clients that have used the file versus all of the clients, or the percentage of clients that have used the file that are defined as trustworthy clients. This reputation score thus provides information about the general trustworthiness of other clients that have encountered that same file. In another embodiment, the reputation score is computed as a number of trustworthy clients that use the file. This reputation score provides information about how many trustworthy users have already used the file. In another embodiment the reputation score is computed as a direct mathematical transformation of the hygiene scores of the clients that used the file. In a simple example, the reputation score is the average of the hygiene scores for all of the clients that have encountered and used the file. This kind of reputation score provides information about the makeup of the typical client that uses the file. Since malware is less likely to be found on good hygiene clients, a higher score indicates that a file can be trusted. Other mechanisms can also be used for computing the reputation scores.

The communication module 360 provides the scores determined by the reputation score module 358 to the client 110. The client 110 can then use these scores in its network access determination.

Referring now to FIG. 4, there is shown a flowchart illustrating the operation of the security module 120/client 110, according to some embodiments of the present invention. It should be understood that these steps are illustrative only. Different embodiments of the security module 120/client 110 may perform the illustrated steps in different orders, omit certain steps, and/or perform additional steps not shown in FIG. 4 (the same is true for FIGS. 5, 6, and 7).

As shown in FIG. 4, responsive to the attempt by the client 110 to connect to the network, the module 120 receives 402 a request from the enforcer 114 to indicate whether an agent 300 is installed on the client 110. If the agent 300 has not been installed, the module 120 indicates 404 to the enforcer 114 that the agent 300 has not been installed. The module 120 then receives 406 the agent 300 from the enforcer 114 for installation on the client 110, and the module 120 installs 408 the agent 300 on the client 110. If the agent has been installed on the client 110, the module indicates 410 this to the enforcer 114. In some embodiments, the agent 300 executes a host integrity script that downloads 412 the cloud module 301 of the security module 120.

In other embodiments, the security module 120 may not be initially present on the client 110, but must be downloaded automatically upon network access. As one example, the enforcer 114 can try to contact the client 110 (e.g., the receiving step 402) using a proprietary port or other proprietary or standard communication protocol as implemented by the security module 120. If there is no response, this is an indication 404 that there is no security module 120, and the enforcer 114 will initiate a download of the security module 120 to the client 110, which can download an agent 300. As another example in which the security module 120 may not initially be present, the enforcer 114 can download a component (e.g., an agent download module 304) or other piece of code that first checks to see if the security module 120 is installed. If not, this component initiates a download from either a corporate server or from the Internet. As still another example, the enforcer 114 may always download the agent 300 because the agent 300 is configured it to be a network-access only agent that runs upon network access. In some cases, the agent 300 is then cleaned up upon successful entry to the secured network.

Referring now to FIG. 5, there is shown a flowchart illustrating the operation of the security module 120, according to some embodiments of the present invention. The security module 120 scans 502 the client 110 to detect a plurality of files on the client 110, and the module provides 503 information about these detected files to the reputation server 116. The security module 120 then retrieves 504 onto the client 110 a reputation score for each of the files detected. The reputation scores are retrieved 504 from the reputation database 111 of the reputation server 116 storing reputation data for files. In some embodiments, the security module 120 also retrieves 504 from the server 116 information regarding matches of the files to any malware threat signatures. In some embodiments, the security module 120 further performs 505 a local malware scan to detect any malware threats currently present on the client 110, and this can include applying a flag to the client 110 to indicate that the client 110 is infected. The flag can then be used in tracking hygiene of the client over time and in calculating the hygiene score of the client 110. The reputations scores and threat matches from step 504 and the scan results from step 505 are used in some embodiments by the module 120 to calculate 506 a preliminary hygiene score, as explained above. In some embodiments, the module 120 further mines 507 historical data (e.g., previously calculated hygiene scores stored on the client 110, etc.).

The security module then calculates 508 the overall hygiene score for the client 110. In some embodiments, the module 120 calculates 508 this score based on the preliminary hygiene score from step 506 and the historical data from step 507. However, this score can be calculated 508 based just on the reputation scores retrieved 504, or based on any other subset of this information or on additional information. The module 120 can also store 509 the hygiene score calculated for later usage during subsequent attempts by the client 110 to connect to a network. In some embodiments, the module 120 tracks and updates the hygiene score of the client 110 over a period of time. The security module 120 then determines whether the hygiene score exceeds a threshold for bad client hygiene. If the hygiene score exceeds the threshold, the security module 120 applies 510 a policy to the client that restricts network access (e.g., provides access only to a quarantine network, limits actions taken on a network, applies a captive portal, etc.). If the client does not exceed the threshold, the security module 120 applies 512 a policy that does not restrict network access (e.g., grants full access).

Referring now to FIG. 6, there is shown a flowchart illustrating the operation of the enforcer 114, according to some embodiments of the present invention. The enforcer 114 detects 602 an attempt by the client 110 to connect to the secure network 112. In some embodiments, the enforcer 114 then inquires 604 from the client 110 whether an agent 300 is already installed on the client 110. If so, the enforcer 114 can receive 606 indication from the client 110 that the agent 300 is installed. If not, the enforcer 114 can receive 608 indication from the client 110 that the agent is not installed, and the enforcer 114 provides 609 the agent 300 to the client 110. In some embodiments, the enforcer 114 provides 609 the agent 300 by making it available for download by the client 110.

As explained above, in other embodiments, the security module 120 may not be initially present on the client 110. As one example, the enforcer 114 can try to contact the client 110 (e.g., the inquiring step 604) using a proprietary port or other proprietary or standard communication protocol. If there is no response, this is an indication 608 that there is no security module 120, and the enforcer 114 will initiate a download of the security module 120. As also explained above, the enforcer 114 can alternatively download a component that checks to see if the security module 120 is installed, and if not, initiates the download. As still another example, the enforcer 114 may always download a network-access only agent that runs upon network access.

Referring now to FIG. 7, there is shown a flowchart illustrating the operation of the reputation server 116, according to some embodiments of the present invention. The server 116 receives 702 from the client 110 information regarding files detected on the client 110. The server 116 then calculates 703 reputation scores for the files, as explained above, and stores 704 the calculated scores for future usage in network access control. The server 116 can also retrieve 705 already-calculated scores from database 111, where scores for certain files have been calculated in advance. The server provides 706 the scores (both the retrieved 705 scores and the calculated 703 scores) to the client 110.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

We claim:

1. A computer-implemented method of applying automatic remediation for enforcing network hygiene of a client, the method comprising:
responsive to an attempt by the client to connect to a secure network, scanning the client to detect a plurality of files on the client;
retrieving onto the client a reputation score for each of the files detected;
calculating on the client a hygiene score for the client based on the reputation scores for the plurality of files detected on the client, the hygiene score indicating a likelihood of the client to engage in risky behavior, wherein the files on the client include files with reputation scores indicating negative security behavior and files with reputation scores indicating positive security behavior, the files with reputation scores indicating negative security behavior affecting the hygiene score to indicate increased likelihood of the client to engage in risky behavior, and the files with reputation scores indicating positive security behavior affecting the hygiene score to indicate decreased likelihood of the client to engage in risky behavior;
determining whether the hygiene score exceeds a threshold for bad client hygiene; and
responsive to the hygiene score for the client exceeding the threshold, applying a policy to the client that restricts access to the secure network.

2. The method of claim 1, further comprising:
responsive to the attempt by the client to connect to the secure network, receiving a request from an enforcer to indicate whether an agent is installed on the client;
indicating to the enforcer that the agent has not been installed;
receiving the agent from the enforcer for installation on the client; and
installing the agent on the client, the agent including data regarding the threshold for bad client hygiene for the client and the policy to be applied to the client based on the hygiene score of the client.

3. The method of claim 1, further comprising, responsive to the attempt to connect to the secure network, downloading onto the client from an enforcer an agent that downloads a cloud module, the cloud module performing the scanning step, the retrieving step, and the calculating step.

4. The method of claim 1, further comprising:
storing the hygiene score calculated for the client for determining whether to allow the client access to the secure network on subsequent attempts by the client to connect to the secure network; and
updating the hygiene score based on a state of the client.

5. The method of claim 1, wherein the hygiene score is calculated using results of a malware scan of the client and using a stored hygiene score previously calculated for the client.

6. The method of claim 1, wherein applying a policy to the client that restricts access to the secure network further comprises allowing the client to access only a quarantine network having a firewall and device manager policy that are both more restrictive than policies for the secure network for which the client attempted access.

7. The method of claim 1, wherein the scanning, retrieving, and calculating steps further comprise performing a cloud-based scan on the client using reputation data stored in a reputation database at a reputation server regarding applications having lower reputation scores than other applications.

8. A non-transitory computer-readable storage medium storing executable computer program instructions for applying automatic remediation for enforcing network hygiene of a client, the computer program instructions comprising instructions for performing steps comprising:
responsive to an attempt by the client to connect to a secure network, scanning the client to detect a plurality of files on the client;
retrieving onto the client a reputation score for each of the files detected;
calculating on the client a hygiene score for the client based on the reputation scores for the plurality of files detected on the client, the hygiene score indicating a likelihood of the client to engage in risky behavior, wherein the files on the client include files with reputation scores indicating negative security behavior and files with reputation scores indicating positive security behavior, the files with reputation scores indicating negative security behavior affecting the hygiene score to indicate increased likelihood of the client to engage in risky behavior, and the files with reputation scores indicating positive security behavior affecting the hygiene score to indicate decreased likelihood of the client to engage in risky behavior;
determining whether the hygiene score exceeds a threshold for bad client hygiene; and
responsive to the hygiene score for the client exceeding the threshold, applying a policy to the client that restricts access to the secure network.

9. The computer program product of claim 8, wherein retrieving onto the client a reputation score for each of the files detected further comprises accessing stored reputations scores stored in a reputation database of a reputation server that were previously determined for the files on the client and receiving reputation scores calculated by the reputation server for new files not previously detected on the client.

10. The computer program product of claim 8, wherein calculating on the client a hygiene score for the client further comprises accessing a stored hygiene score previously calculated for the client.

11. The computer program product of claim 8, further comprising instructions for:
  performing a local malware scan of the client;
  determining, based on the local malware scan, that the client is infected with malware;
  applying a flag to the client to indicate that the client is infected; and
  applying the flag along with the reputation scores for the plurality of files in calculating the hygiene score of the client.

12. The computer program product of claim 8, wherein determining whether the hygiene score exceeds a threshold further comprises determining whether a count of a number of malware threats on the client per time period exceeds the threshold.

13. The computer program product of claim 8, further comprising instructions for:
  responsive to the attempt by the client to connect to the secure network, providing an indication to an enforcer that a security module has not been installed; and
  receiving and installing a security module that downloads components for performing each of the steps.

14. The computer program product of claim 8, wherein allowing limited network access further comprises placing the client into a group of clients that have access only to a network with a firewall, an application policy, and a device manager policy that are more restrictive than for the secure network for which the client attempted access.

15. A computer system for applying automatic remediation for enforcing network hygiene of a client, the system comprising:
  a non-transitory computer-readable storage medium storing executable software modules, comprising:
    a scanning module for scanning the client to detect a plurality of files on the client in response to an attempt by the client to connect to a secure network;
    a reputation score module for retrieving onto the client a reputation score for each of the files detected;
    a hygiene score module for calculating on the client a hygiene score for the client based on the reputation scores for the plurality of files detected on the client, the hygiene score indicating a likelihood of the client to engage in risky behavior, wherein the files on the client include files with reputation scores indicating negative security behavior and files with reputation scores indicating positive security behavior, the files with reputation scores indicating negative security behavior affecting the hygiene score to indicate increased likelihood of the client to engage in risky behavior, and the files with reputation scores indicating positive security behavior affecting the hygiene score to indicate decreased likelihood of the client to engage in risky behavior;
    a threshold determination module for determining whether the hygiene score exceeds a threshold for bad client hygiene;
    a policy module for applying a policy to the client that restricts access to the secure network in response to the hygiene score for the client exceeding the threshold; and
  a processor configured to execute the software modules stored by the computer readable storage medium.

16. The system of claim 15, wherein the hygiene score module is further configured for calculating the hygiene score using the reputation scores retrieved, using information retrieved regarding matches of the files to malware signatures, and using a stored hygiene score previously calculated for the client.

17. The system of claim 15, wherein the threshold determination module is further configured for determining whether a count of a number of malware threats on the client per time period exceeds the threshold.

18. The system of claim 15, wherein the policy module is further configured for allowing the client to access only a quarantine network having a firewall, an application policy, and a device manager policy that are more restrictive than policies for the secure network for which the client attempted access.

19. The system of claim 15, wherein the hygiene score module is further configured for:
  determining that the client has third party security software pre-installed;
  collecting security data from a log for the third party software; and
  analyzing previous threats on the client provided in the log, wherein results of the analysis are included in the calculation of the hygiene score for the client.

20. The system of claim 15, wherein the reputation score for each file is an assessment of the likelihood that the file is malicious, and wherein the hygiene score for the client represents an assessment of trustworthiness of the client, wherein the trustworthiness is a measure of a propensity of the client for getting infected by malware, where a client that is infected more often is less trustworthy.

* * * * *